(12) United States Patent
Pei et al.

(10) Patent No.: US 9,286,369 B2
(45) Date of Patent: Mar. 15, 2016

(54) DATA REPLICATION ACROSS ENTERPRISE BOUNDARIES

(75) Inventors: Mingliang Pei, Palo Alto, CA (US); Oanh Hoang, Fremont, CA (US); Ruiping Sun, Fremont, CA (US); John Huang, San Ramon, CA (US)

(73) Assignee: Symantec Corporation, Mountain View, CA (US)

( * ) Notice: Subject to any disclaimer, the term of this patent is extended or adjusted under 35 U.S.C. 154(b) by 1208 days.

(21) Appl. No.: 12/649,829

(22) Filed: Dec. 30, 2009

(65) Prior Publication Data

US 2011/0161289 A1 Jun. 30, 2011

(51) Int. Cl.
*G06F 17/30* (2006.01)

(52) U.S. Cl.
CPC .................................. *G06F 17/30581* (2013.01)

(58) Field of Classification Search
CPC .......... Y10S 707/959; Y10S 707/9994; G06F 17/30575; G06F 17/30581
USPC ........................................................ 707/610
See application file for complete search history.

(56) References Cited

U.S. PATENT DOCUMENTS

| | | | |
|---|---|---|---|
| 5,581,753 A * | 12/1996 | Terry et al. | |
| 5,758,355 A * | 5/1998 | Buchanan | |
| 5,910,987 A * | 6/1999 | Ginter et al. | 705/52 |
| 5,913,029 A * | 6/1999 | Shostak | 709/203 |
| 6,065,018 A * | 5/2000 | Beier et al. | 707/610 |
| 6,094,721 A * | 7/2000 | Eldridge et al. | 713/168 |
| 6,098,078 A * | 8/2000 | Gehani et al. | 707/610 |
| 6,098,111 A * | 8/2000 | Maegawa et al. | 719/310 |
| 2005/0210073 A1* | 9/2005 | Oeda et al. | 707/200 |
| 2006/0136519 A1* | 6/2006 | Batta et al. | 707/204 |
| 2007/0127457 A1* | 6/2007 | Mirtorabi et al. | 370/389 |
| 2008/0109497 A1* | 5/2008 | Holenstein et al. | 707/204 |
| 2008/0168072 A1* | 7/2008 | Freedman | 707/100 |
| 2010/0174863 A1* | 7/2010 | Cooper et al. | 711/113 |
| 2011/0185141 A1* | 7/2011 | Dhuse et al. | 711/165 |

* cited by examiner

*Primary Examiner* — Joe Chacko
(74) *Attorney, Agent, or Firm* — Wilmer Cutler Pickering Hale and Dorr LLP

(57) ABSTRACT

Systems and methods for synchronizing verification data in a distributed database including client and server databases. The server database may exchange verification data regarding one-time passwords to multiple client databases. An update to the server database may be initiated based on information stored in the client database by pushing updated verification information from the client database to the server database via an SSL tunnel. An update to the client database may be initiated based on information stored in the server database by pulling updated verification data from the server database to the client database via an SSL tunnel. The client database and the server database may include a two-dimensional data field including the verification data and an associated key identifier, and a site ID. The site ID may include a unique identifier to identify the respective database in which it is included. The data field may include a sequence number assigned to each row of data that increases every time the row of information is updated. The client database and the server database may also include a replication tracking table including a record of the last known update to a remote database. Data fields that require updating may be determined based on the site ID and a comparison of the sequence numbers from the replication tracking table and the server's database.

24 Claims, 11 Drawing Sheets

Site 1 — 310

720 →

| P. Key 312 | Data 314 | Site ID 316 | Seq. # 318 |
|---|---|---|---|
| 1 | XYZ | Site1 | 102 |
| 2 | 1234 | Site2 | 200 |

| Remote Site ID | Remote Table Name | Remote Site Last Seq. # |
|---|---|---|
| Site2 | Table1 | 200 |

350

Site 2 — 320

| P. Key 322 | Data 324 | Site ID 326 | Seq. # 328 |
|---|---|---|---|
| 1 | RST | Site2 | 201 |
| 2 | 1234 | Site2 | 200 |

| Remote Site ID | Remote Table Name | Remote Last Seq. # |
|---|---|---|
| Site1 | Table1 | 101 |

DATA REPLICATION ACROSS ENTERPRISE BOUNDARIES

BACKGROUND OF THE INVENTION

Distributed databases are a significant feature of many modern network applications, including DNS resolution, user validation, financial support, and myriad business activities. One issue common to distributed database applications is the need for data integrity among the various copies of the database, particularly in light of updates, and the like, that cause changes to the data. This issue often involves a balance of many factors, including the nature and volume of the data, the number and function of copies of the database, and rates of change and access to the data.

One example of replicating data in a distributed database involves a master and slave relationship between a primary (master) server and one or more secondary (slave) servers. In these types of configurations, a simple one-way replication may be achieved by distributing changes from the primary server to the secondary server(s). However, these systems are of limited use in many modern services that benefit from capabilities that are not possible using a standard master-slave relationship and updating scheme. For example, in certain services a write ability at more than one primary server may be desirable to improve efficiency of the overall system.

Certain applications, such as distributed authentication networks, may require data replication among multiple provider sites, and also between the service provider and an issuer who hosts a local service node. Existing database replication software products pose a requirement to use VPN between a source and a target site in order to properly communicate across the internet. These products are best suited for replication among sites controlled by the same entity, but can present problems for data replication across two sites managed by two different authorities. For example, there are risks in VPN channels being misused that weigh against one entity opening themselves to other unrelated entities by VPN. There are also tasks with security policy control, support, and maintenance that are more challenging when using VPNs. Different administrative jurisdiction, policies and requirements among different sites also make the use of VPNs problematic.

Additionally, many applications have particular concerns with respect to integrity, performance, and recovery of data in the database. For example, in systems that are relied on to provide critical support services for the internet, concerns such as the reliable availability of the service, the ability to improve access through geographic distribution of operational components, and data backup and recovery are all critical. Known methods for replication fail to address all of these factors in an efficient way, that also allows for acceptable secure exchanges across enterprise boundaries. Finally, known methods are limited in their ability to detect certain types of attacks, such as replay attacks, in a timely and reliable manner in a distributed network.

SUMMARY OF THE INVENTION

The present subject matter may provide benefits in replication of data among various entities, such as in distributed database structures. According to aspects of the invention, improvements may also be achieved in the recognition, reporting and response to security threats, such as, for example, replay attacks. Embodiments may include a client and server protocol for communication across a network, such as the Internet, via SSL tunneling. Disclosed systems and methods may support replication with data from multiple provider sites and multiple client sites. Embodiments may also support replication between a client that acts a token issuer and the token service provider.

The underlying replication may include the use of a unique ID for each table across all sites, including a site ID and the site's sequence number (SISN), and timestamp information to discover and compare data changes. Instead of replicating all database events, e.g. reversed from a database "redo log" as many third party products do, the present subject matter provides, in embodiments, implementations that may efficiently query for new updates after a last successfully replicated ID and apply the snapshot of updated information to the other site. Efficient conflict resolution may also be achieved according to the data structures by using timestamp information for comparison, and/or trusted source site designation, and other information such as an OTP counter.

Embodiments may include systems and methods for synchronizing verification data in a distributed database including client and server databases. In embodiments, the server database may exchange verification data regarding one-time passwords to multiple client databases. A client server may receive a user token identifier and a one-time password. A one-time password may be validated at the client server based on verification data stored in a client database. The verification data may be associated with the user token identifier. A validation response may be provided from the client server based on the validating of the one-time password.

In embodiments, the verification data may be updated in the client database based on the validation response. An update to the server database may be initiated based on information stored in the client database, for example, by pushing updated verification information from the client database to the server database via an SSL tunnel.

In embodiments, an update to the client database may be initiated based on information stored in the server database, for example, by pulling updated verification data from the server database to the client database via an SSL tunnel.

Embodiments may include updating the verification data regarding the token identifier in the client database based on updated information pulled from the server database.

In embodiments, the client database and the server database may include a two-dimensional data field including the verification data and an associated key identifier, and a site ID. The site ID may include a unique identifier to identify the respective database in which it is included. In embodiments, the data field may include a sequence number assigned to each row of data. The sequence number may increase every time the row of information is updated. The client database and the server database may also include a replication tracking table including a record of the last known update to at least one of the server database and another client database. The record may include, for example, a site ID and a sequence number. The sequence number in the replication tracking table may be last known sequence number associate with a remote database. In embodiments, data fields that require updating during a pull may be determined based on the site ID and a comparison of the sequence number in the server database and at least one of the client databases. A data field may be determined to have been changed when it has a larger sequence number than that of data in another database with the same site ID.

In embodiments, an update to at least one of the databases may include downloading a shared secret for an initial token record. The presence of a new, or initial, token record may include comparing a create sequence number to a given sequence number in the at least one database. Embodiments may include determining whether to include the shared secret for the token record in the update information based on the comparison of the create sequence number and the given sequence number for the update operation. In embodiments, the presence of a shared secret in the update information causes the receiving database to create a new record.

Embodiments may include independently updating the server database and client database during an inter-update period between the server database and client database. The server database and/or client database may resolve which update information to apply from independent updates based on at least one of unique data within the updated information, timestamp data within the updated information; and an authority assigned to the database with the updated information. In embodiments, the unique data may include a one-time password moving factor, and/or a token status identifier.

Embodiments may include configurations in which the client server includes a plurality of client servers. Each client server may maintain a respective client database. In embodiments, different verification data conflict resolution rules may be set by different client servers.

Embodiments may include features that allow validating for a single user token identifier by various client servers to proceed asynchronously with respect to the updating.

Embodiments may include receiving a request to update a server database from a first client database by pushing updated verification data regarding one-time passwords from the first client database to the server database via an SSL tunnel. Verification data stored in the server database may be updated based on the updated verification data from the first client database. A request to update at least one of the first client database and a second client database based on information stored in the server database may be received by pulling updated verification data from the server database to the at least one of first client database and second client database via an SSL tunnel. Updated verification information regarding the token identifier may be sent to the at least one of first client database and second client database requesting the updated verification information from the server database.

Embodiments may include receiving an identifier and a one-time password at a client server. The one-time password may be validated at the client server based on verification data stored in a client database. The verification data may be associated with the identifier. A validation response may be provided from the client server based on the validating of the one-time password. The verification data may be updated in the client database based on the validation response. An update to the server database from the client database may be initiated by pushing updated verification information from the client database to the server database. An update to the client database from the server database may be initiated by pulling updated verification information from the server database to the client database. The verification information regarding the identifier may be updated in the client database based on updated information pulled from the server database.

In embodiments, the updating may be conducted over an SSL tunnel between the server and client database, and the updating may be initiated only by requests from the client and conducted over an SSL tunnel between the server and client database formed in response to the requests.

Embodiments may include comparing a sequence number associated with updated information from a client database to another sequence number associated with stored information in at least one of another client database and/or the server database. In embodiments, if the numbers match, a replay attack associated with the key identifier for the updated information may be reported.

Further advantages of the present subject matter will become apparent to those of ordinary skill in the art upon reading and understanding the following detailed description of the preferred embodiments.

BRIEF DESCRIPTION OF THE DRAWINGS

FIG. 7 depicts an exemplary stored data structure in accordance with an embodiment of the present invention;

DETAILED DESCRIPTION OF THE INVENTION

The following detailed description is provided with reference to exemplary embodiments for the ease of description and understanding. Applicants' invention is not limited to the disclosed embodiments, and encompasses other variations that fall within the overall scope of description provided herein.

Embodiments of the present invention may provide benefits in the maintenance and synchronization of shared databases across enterprise boundaries, such as in the case of OTP databases, and the like, that may be shared among various clients and one or more service providers. Improvements may also be achieved in the recognition, reporting and response to security threats, such as, for example, replay attacks.

Figure 1:
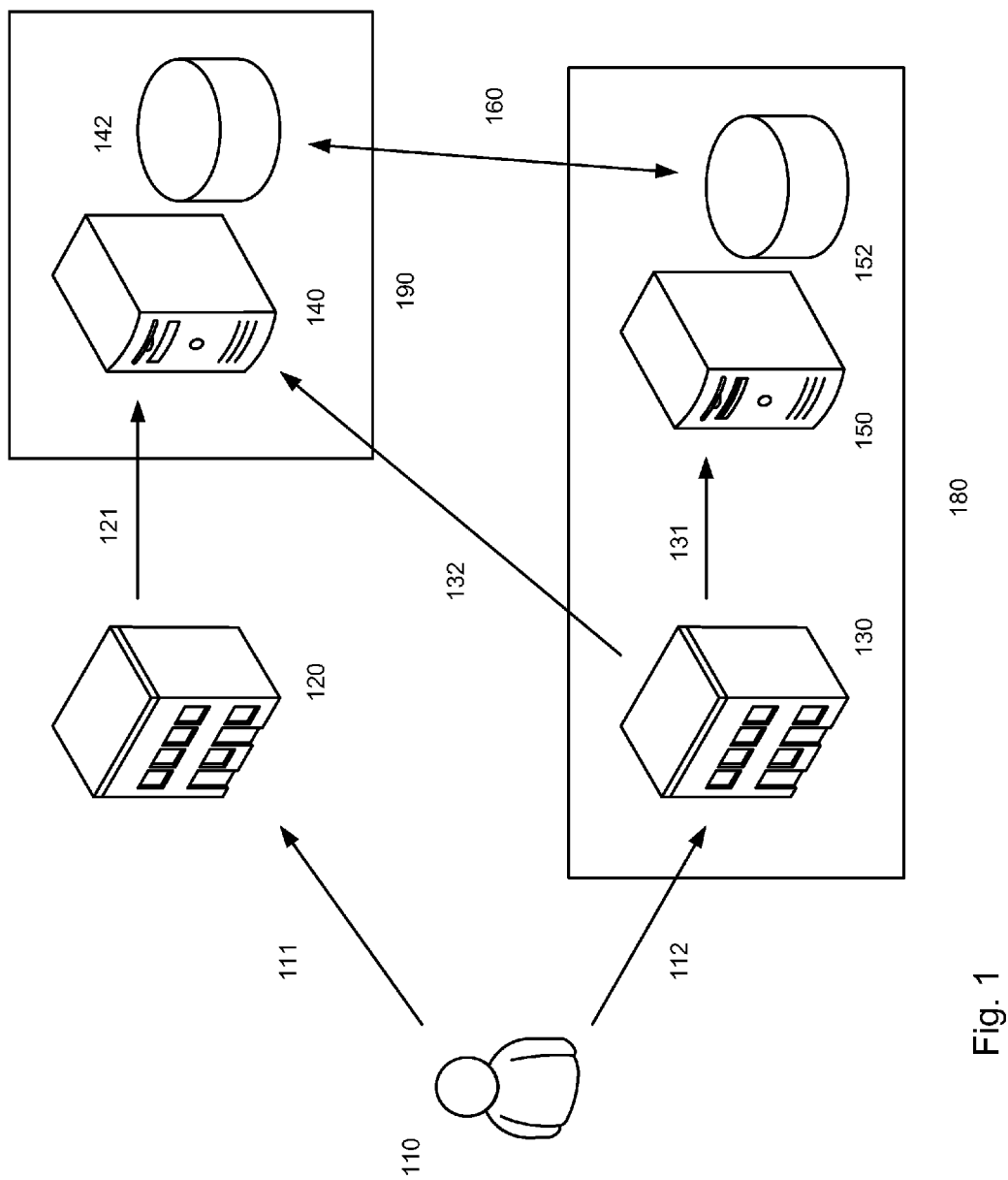
FIG. 1 depicts an exemplary system in accordance with an embodiment of the present invention.

As depicted in FIG. 1, embodiments may include a distributed database, for example a database that is at least partially shared between a service provider server 140 and client service provider server 150. Service provider server 140 may include a database 142 and client service provider server 150 may include a database 152 that share at least portions of a distributed database. Although one client service provider 180 and one third party application 120 are depicted for ease of description and understanding, in embodiments, the service provider 190 can, and typically will, support multiple client service providers and/or third party applications.

A user 110 may access a client service provider's application 130 or another third party's application 120 that requests validation or other information. For example, a user may have an OTP supported by the client service provider 180 and log on for service related to the OTP via request 112 to client service provider application 130. The client service provider application 130 may access the client service provider server 150 via request 131, and/or access a service provider 190's server 140, to, for example, validate the user's OTP. In embodiments, a client service provider 180 may be authorized to issue and validate tokens on behalf of, or in coordination with, service provider 190. As such, at least partial replication between databases 142 and 152 via link 160 may be important to allow client service provider 190 to issue and/or validate tokens that are supported by the service provider 190. Such mechanisms may provide flexibility for a user 110 to access services in different ways, e.g. through the client service provider 180 validation process, or different third parties' (e.g. other parties relying on validation by the service provider 190) relationships with various client service providers 190.

By using a configuration including a link 132 between a client service provider 180 and service provider 190, a client service provider's local application 120 may access a remote validation server 140, for example in case of failure of the client service provider's local server 150. This may be advantageous in providing alternative service from the service provider 190 so that the client service provider's local service is not required to maintain high availability, and can fail-over to service provider 190, as needed, while generally maintaining better latency and performance of a local client service provider system.

Alternatively, the user 110 may use an OTP via request 111 to relying party's application 120. In embodiments, application 120 may be supported via a request 121 to a client service provider 190 that is authorized to perform partial services, such as validation, on behalf of the service provider 180. There may also be benefits in the client service provider 190 being configured to perform local validation, such as for OTPs, by reducing latency and/or reducing the client service provider 190's dependence on external services.

It should be understood that a service provider, such as a token issuer, as well as individual client service, may deploy local validation servers in multiple sites. In such configurations, it may be preferable to allow only a single pipe between the service provider's network and individual client networks for data replication. Within each network, data may be replicated according to network-specific rules. For example, when the service provider network consists of multiple sites, only one server in one of the sites may be set to active listening to accept update requests, and the rest in the other sites may be set to passive with respect to replication outside of the network.

As shown in FIG. 1, the client service provider application 130 may be configured to interact with the service provider server 140 via link 132, for example to validate tokens if the local validation server is down, thereby providing a reliable failover backup from the server provider server.

In embodiments, when a user interacts with applications 120, 130, such as to validate an OTP, validation data stored in either of databases 142, 152 may be updated. After such an occurrence, replication between databases 142, 152 may be required to maintain serviceability and integrity in the distributed database and supported service. Further details regarding an exemplary methodology for establishing and replicating data among databases, such as those shown in FIG. 1, may be found in FIG. 2.

Figure 2:
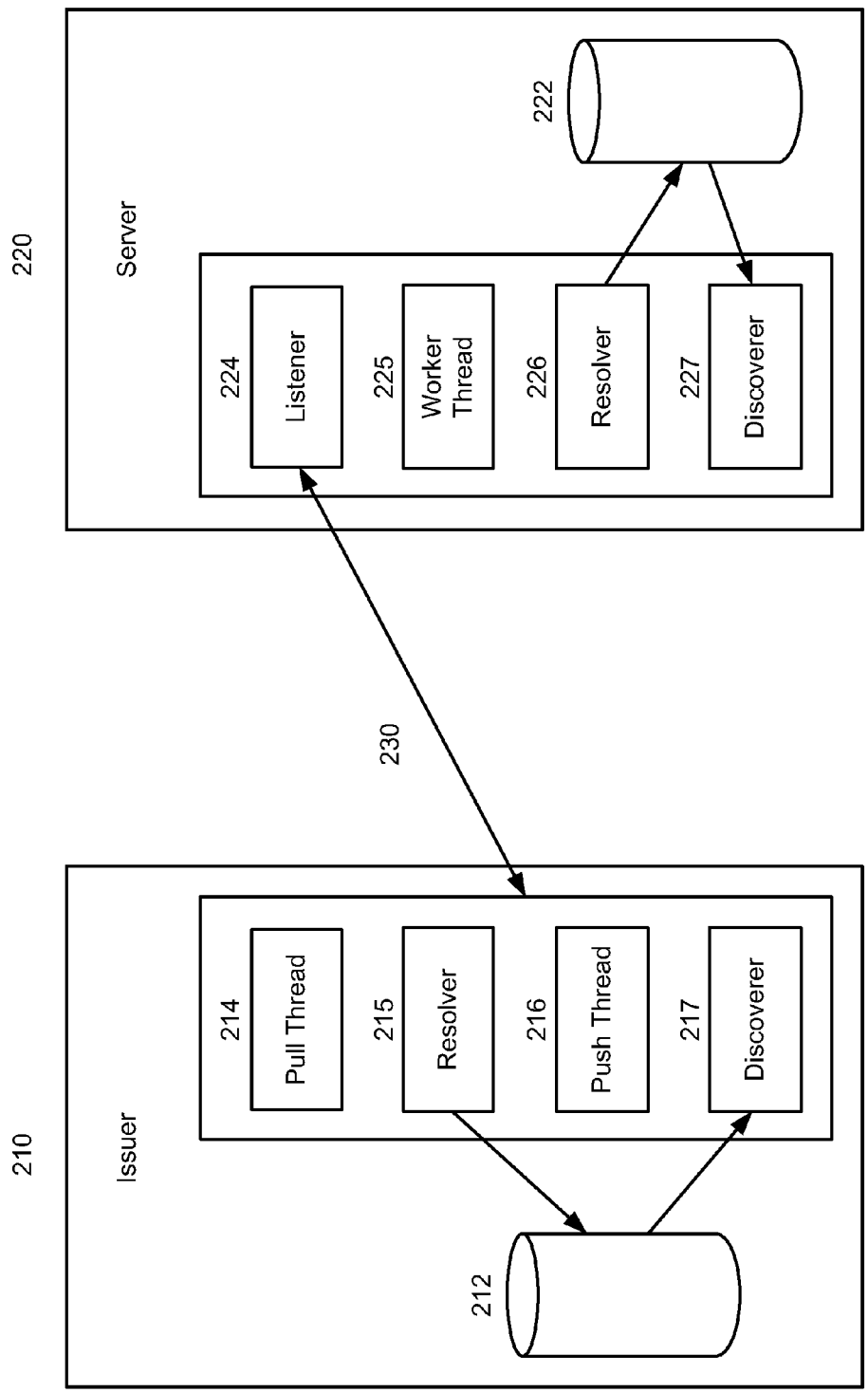
FIG. 2 depicts an exemplary system in accordance with an embodiment of the present invention.

As shown in FIG. 2, a client service provider server 210, which may be similar to 150 depicted in FIG. 1, may include a database 212, and combinations of hardware, computer processor(s) and programming instructions constituting pull thread unit 214, resolver unit 215, push thread unit 216 and discoverer unit 217. A service provider server 220, which may be similar to 140 depicted in FIG. 1, may include a database 222, and combinations of hardware, computer processor(s) and programming instructions constituting listening unit 224, worker thread unit 225, resolver unit 226 and discoverer unit 227. Communication between the servers 210, 220 may be established by link 230, such as by an SSL tunnel where client/sever SSL authentication is enforced. In embodiments, the client service provider server may establish an SSL tunnel with the service provider server 220 through communication with listening unit 224. Thus, improvements in the efficiency of operating service provider server 220 may be achieved though allowing the service provider server 220 to operate in a listening only mode, until a client service provider initiates communication through a push or pull operation, such as those described further below.

Within the client service provider server 210, updates to the database 212 may be performed via resolver unit 215 and operation 240. For example, pull thread unit 214 may initiate a pull requesting updated information from service provider server 220. In the event of a positive response, i.e. the database 222 contains some discrepancies with database 212, the resolver unit 215 may determine what, if any, changes need to be made to database 212 and initiate such changes via instruction 240. Similarly, data changes pushed to service provider server 220 may be resolved by resolver unit 226 and database 222 updated as needed by instruction 250. Queries 242, 252 may also be used between the databases 212, 222 and their respective discoverer units 217, 227, in order to identify and construct appropriate data to be sent, such as, for example, local data changes after a given sequence number.

In embodiments, according to architecture similar to that depicted in FIG. 2, a "replication client", e.g. client service provider server 210, may initiate all replication requests. This may include a pull replication to download changes that have occurred in the service provider's site, e.g. service provider server 220, and push replication to post locally changed data since a last synchronization period. The pull and push threads in such a client configuration may periodically query any updates in local client service and the remote service provider site, and may make such requests for replication in real time. A replication server, such as service provider server 220, may constantly listen for any replication requests including site information exchange and changed data exchange. Exemplary aspects of data configuration are discussed below with reference to FIG. 3.

Figure 3:
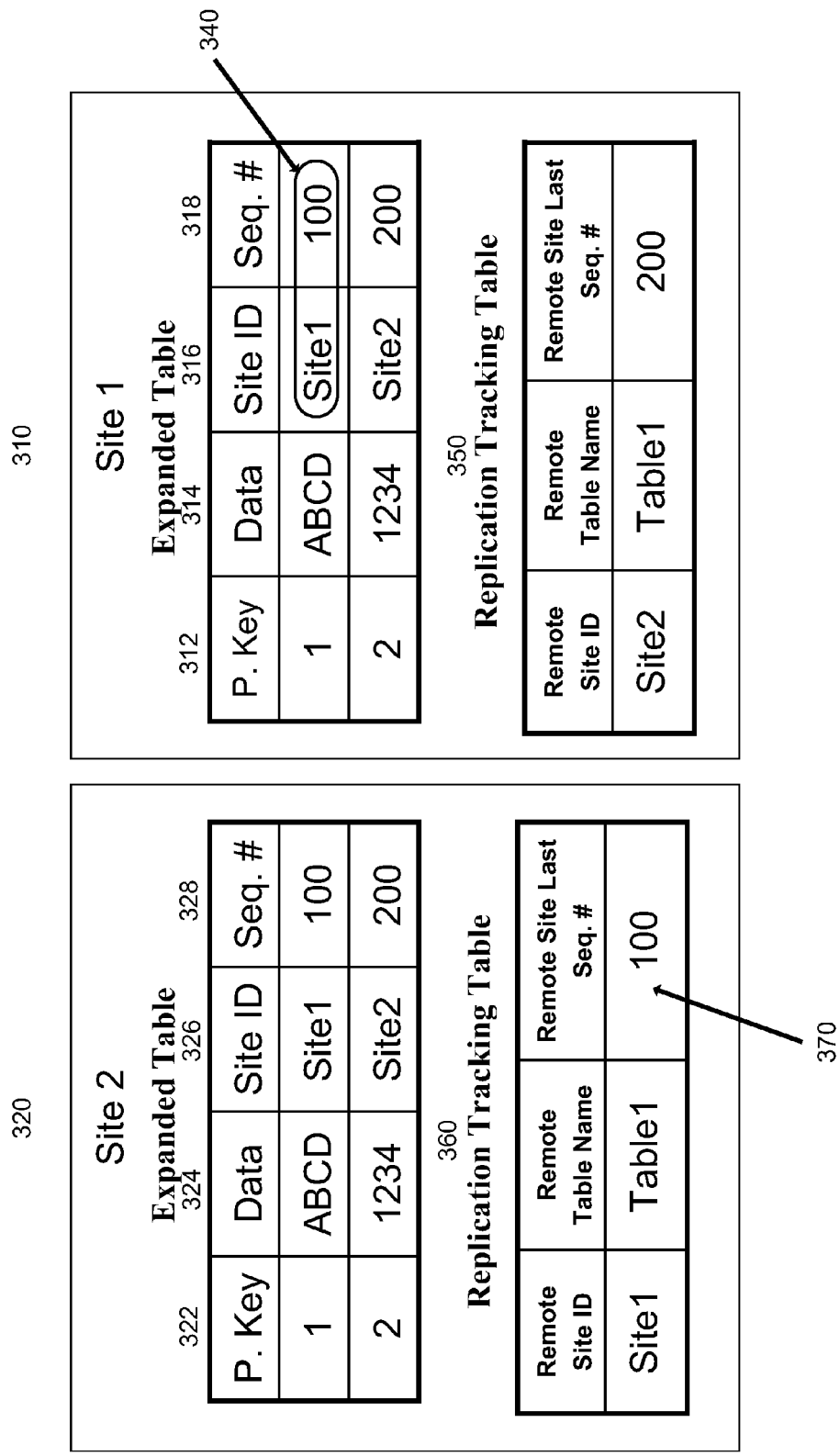
FIG. 3 depicts an exemplary stored data structure in accordance with an embodiment of the present invention.

As shown in FIG. 3, a service provider site 310 and a client service provider site 320 may include a two-dimensional data field including, for example, primary key columns 312, 322, data field columns 314, 324, Site ID columns, 316, 326, and Sequence Number columns 318, 328. An additional "create sequence number" may also be included for establishing new records. Sites 310, 320 may share at least a portion of similar data in columns 314, 324. For example, data columns 314, 324 may include the data "ABCD" for key row "1".

In embodiments, a unique logical ID (LID) may be defined in a database for each row update for any table that should be replicated. For example, an LID 340 may consist of a site ID and a sequence number (SISN). Rows, LIDs, and/or SISNs may also have timestamp data associated therewith, for example to assist in conflict resolution. A given site may include group of service provider servers that share the same database. A database sequence number may be used to monotonically track any row updates. For example, when an OTP application updates a row in a table that needs to be replicated to other sites, the sequence number may be updated to be a next available number. Thus a new sequence number may indicate that the row has been changed.

According to embodiments, the client database and the server database may also include a separate replication tracking table. Exemplary replication tracking tables are depicted in FIG. 3. For example, a service provider site 310 may include replication tracking table 350 and client service provider site 320 may include replication tracking table 360. Replication tracking tables 350, 360 include a record of the last known updates to the respective databases at the sites 310, 320.

As shown in FIG. 3, a replication record may include, for example, a site ID for the corresponding remote site and a last known sequence number for the remote site, as well as a table name or other identifier. In embodiments, data fields that require updating during a pull may be determined based on the site ID and a comparison of the sequence number in the server database and at least one of the client databases.

Figure 4:
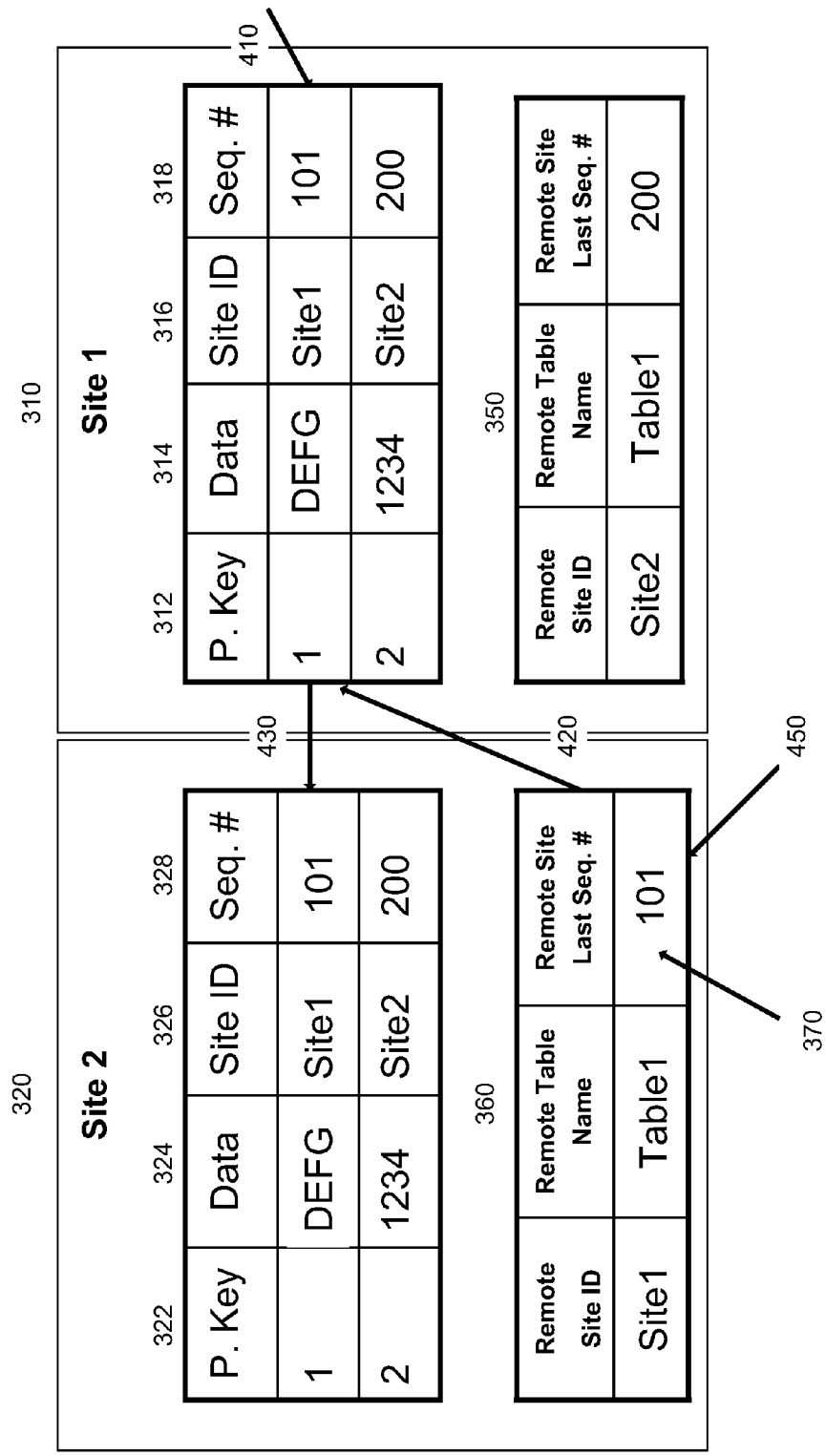
FIG. 4 depicts an exemplary stored data structure in accordance with an embodiment of the present invention.

For example, as shown in FIG. 4, a change 410 may be received at site 310 that changes data corresponding to Key "1". Site 310 updates Key "1" to include data "DEFG" and increments the corresponding sequence number to "101". Site 320 may thereafter get updates from site 310 using the last known sequence number for the corresponding site and table number. In this case, the last sequence number 370 depicted in FIG. 3 was "100", so the query 420 is based on that number. Site 310 identifies the different sequence number "101" now present in Key "1" and sends updated data and sequence number to site 320 via update 430. Site 320 may then apply this data, as appropriate depending on any conflict resolution, to it's Key "1" data and update the sequence number in Key "1" and the replication table 360 field 450. In this case, the remote site last sequence number is changed to "101" according to the sequence number reported by site 310.

Figure 5:
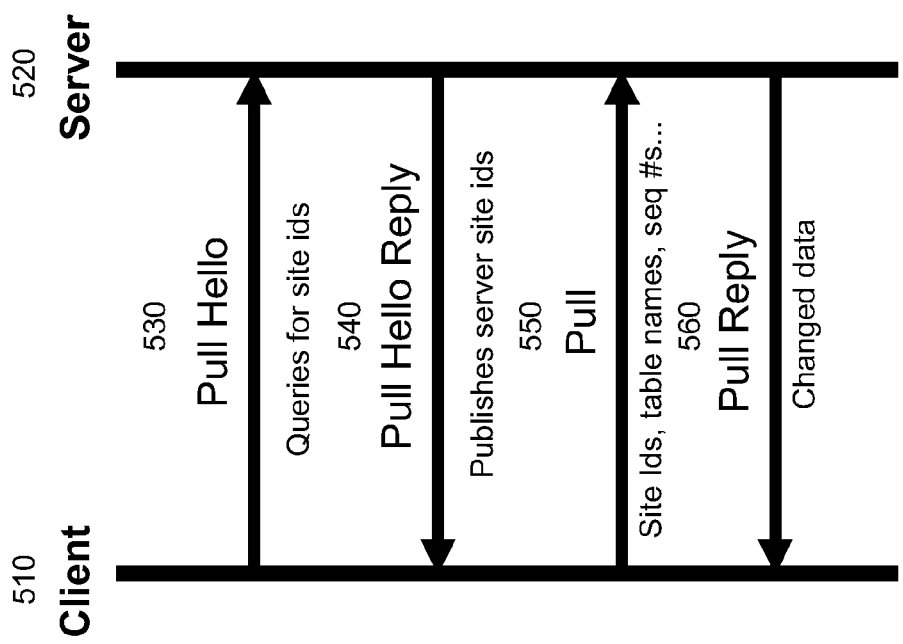
FIG. 5 depicts an exemplary method in accordance with an embodiment of the present invention.

Further aspects of exemplary pull and push operations are described with reference to FIGS. 5 and 6. As shown in FIG. 5, a client 510 may initiate a pull update operation by sending a "Pull Hello" 530 to server 520. The hello 530 may include, for example a client site ID list and the like. As indicated previously, a server 520 may be advantageously set in a listen only mode until an update is initiated by a pull or push communication from a client. In embodiments, the client publishes its site ID list to the remote site. At the same time, the client may ask for the remote site's site ID list that will appear in its database record and will be replicated. A list of site IDs may be used when an issuer deploys servers into multiple sites. Each site may then have its own site ID. The site ID may be replicated to all the databases within the issuer network.

Upon receiving a Site ID "Pull Hello" 530, the server may authenticate the client, and record a mapping between the issuer's account ID and the site ID Thus, particular records within the client site ID list may be separately controlled with respect to, for example, authority for conflict resolution etc. For example, a client may be authoritative for tokens issued by the client, certain classifications, etc., but also maintain non-authoritative records for other tokens, e.g. tokens the client is allowed to authenticate. The server may also discover the last sequence number that the server knows for the client site IDs.

Server 520 may respond to the hello with reply 540, which may include, for example, the server site IDs, e.g, (site_id_MV, site_id_BR).

After receiving a reply 540, the client may request the pull 550 including, for example, site IDs, table names and last known sequence numbers. For example, now knowing the remote site's current site ID list, the client may query from its own database the last replicated sequence number about the records from the remote site. This can be done by querying the replication tracking table for each target table, for example, select last_seq_num from vs_vip_rep_sisn_t where site_id=<remote site ID>;

The client may then use this message to publish the number to the server, and ask for new records occurring after this number.

Based on the information received in the pull request 550, the server 520 may identify appropriate updated information, e.g. rows updated since last known sequence numbers, new data elements etc., and prepare a response to the pull request 550. For example, upon receiving the client's request for newer data after the given sequence number, the server may invoke a discover unit to discover changes newer than the given last sequence number for a site ID, including new tokens and updated tokens.

The server 520 may then send a reply 560 to the client 510 that includes updated information including row data, and updated sequence numbers for the server 520. Updated data records may respond to queries in bulk, and be sent in a stream. Static row data such as the token shared secret may be included only for first time downloads of data, such as newly issues tokens. The data format is able to indicate whether a record will lead to an insert or update transaction in the Resolver unit of the data receiving side.

As discussed above, the client 510 may then update information, as necessary, including updating the data table and the replication tracking table. In this regard, the client may invoke a resolver unit, which may help determine whether to apply newer records to a local store. If a token record contains shared secret, indicating a new record, the resolver may attempt to insert the row first. Otherwise, the resolver may attempt to update the row.

Examples of data change discovery rules that may be applied by a discoverer unit 217, 227 in FIG. 2 are as follows. Assume that the discover unit receives a last successfully replicated sequence number (last_rep_seq_num) from the remote site about the discoverer's site. The discoverer unit may query all updated rows newer than the last replicated sequence. A row may be detected as "newer" according to the following query:
select*where update_seq_num>last_rep_seq_num;

Embodiments may also include recognizing new data elements, such as newly issued tokens and the like. In such circumstances, update operations may include additional update information beyond that normally retrieved for updating existing elements. New tokens may also be detected and handled as follows. For a token record table, new tokens may be detected according to the column of create sequence number (create_seq_num) as follows:
create_seq_num>last_rep_seq_num;

The discoverer unit may be configured to decrypt and include a token shared secret only for the new token records. For other identified token rows, only selected runtime dynamic data columns may be sent.

Figure 6:
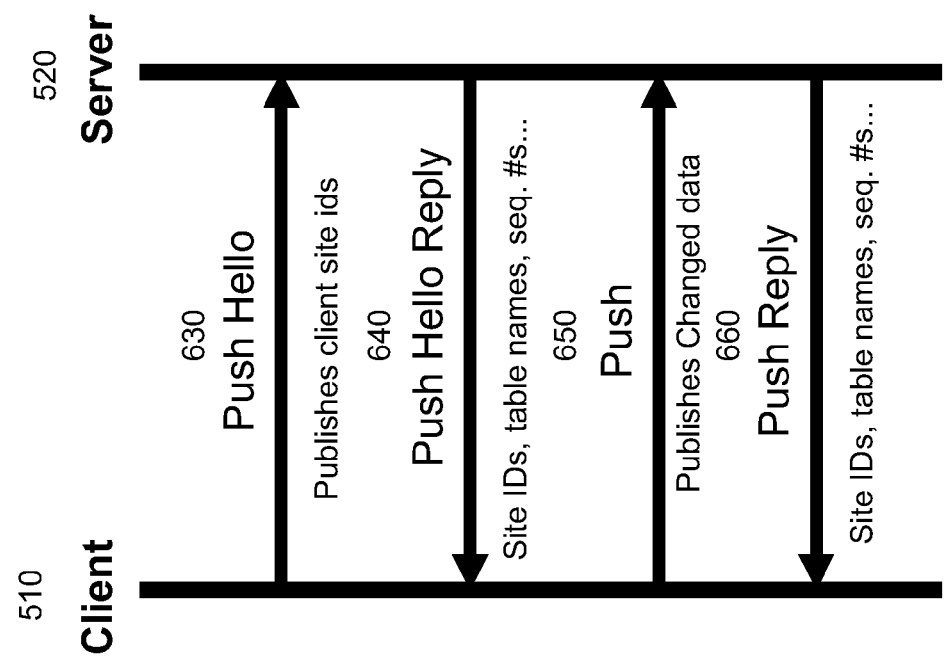
FIG. 6 depicts an exemplary method in accordance with an embodiment of the present invention.

FIG. 6 depicts aspects of an exemplary push operation. As shown in FIG. 6, the client 510 may initiate a push operation with server 520 via a "Push Hello" 630. The hello 630 may include, for example, a list of client site IDs. The hello 630 message may serve as the push initialization message to the server 520, which is in listening mode. The hello 630 may include a request for the server 520's last sequence number that has been successfully replicated from the server 520's site.

Upon receiving the hello 630, the server 520 may query its database about the last replicated sequence numbers associated with the target tables and each of the client site ID lists, and include the results of the query in a reply 640, including for example, site IDs, table names, and last replicated sequence numbers.

Upon receiving the reply 640, the client may invoke a discoverer unit to detect all changed records after the sequence number given by the server 520. The client 510 may then construct a data message to include all changes. The discoverer unit may pass the data to the server 520 via push thread 650. In embodiments, the push thread may be sent to the remote server 520 in a streaming fashion in order to provide performance enhancements, such as when there are many updated rows to send.

Upon receiving client posted data update records, the server 520 may invoke a resolver unit to determine appropriate updates its local store. This may include merging newer changes to the server local store as well as updating last replicated sequence numbers for the source site IDs in the server 520's replication tracking table. In embodiments, the server 520 may notify the client 510 with a "done" reply, so that the client 510 can start another push. The done reply 660 may include information such as the last replicated sequence number.

In certain circumstances, conflict resolution rules may be called into play, to determine what action to take for proper replication. For example, as depicted in FIG. 7, there is a possibility that site 310 and site 320 may receive independent updates 720 and 730 respectively to Key "1". If site 310 and site 320 are both configured to act on such updates independently, such as independent token validation authority, the Key "1" data may be updated and the sequence numbers incremented in both sites. As shown in FIG. 7, each of sites 310 and 320 may be assigned different rules for incrementing the counters, such as the service provider's server having one incrementing rule, and client servers having different incrementing rules. Thus, the sequence number in site 310 may be incremented to "102" whereas the corresponding sequence number in site 320 may be incremented to "201". When site 320 attempts to initiate an update via a push or pull operation with site 310, a conflict will result based on the different sequence numbers in both of the sites.

In embodiments, the server database and/or client database may resolve which update information to apply from independent updates based on unique data within the updated information, timestamp data within the updated information, and/or an authority assigned to the database with the updated information. For example, the unique data may include a one-time password moving factor, and/or a token status identifier, which may represent whether a token is enabled, or disabled, by an issuing authority. In embodiments, a DISABLED token within an allowed server clock drift between two sites may be prioritized. An update with higher one-time-password moving factor between two sites may be prioritized. Additionally, an update with information indicating a predetermined trusted source may take priority over other updates.

As mentioned previously, embodiments may include configurations in which the client server includes a plurality of client servers. According to described methods, each client server may maintain a respective client database and different verification data conflict resolution rules may be set by different client servers. This may be advantageous and more appealing to some clients that do not want a centrally managed resolution scheme. Embodiments may also include allowing validating for a single user token identifier by various client servers to proceed asynchronously with respect to the updating.

In embodiments, timestamp data associated with the row, LID, and/or sequence number may be used as part of conflict resolution. For example, if there is not a priority established by other unique data, such as discussed above, the resolver may look to timestamp data and assign priority to the data with the later timestamp. Although such methodology may be employed independently, it can preferably be used in conjunction with other rules to provide a hierarchical conflict resolution. By using timestamp data as a secondary consideration, proper replication may be achieved even in circumstances where clock synchronization among sites is not reliable.

In embodiments, a pre-designated trust site may be identified and accorded priority over other sites. For example, a local validation server at an issuer site may be considered a more trusted source for its tokens than a service provider, or other client service. In embodiments, an issuing client may be assigned a first priority, a service provider may be assigned a second priority, and a non-issuing client may be assigned a third priority.

In embodiments, if all conflict resolution rules fail, a reject notification may be sent to an originating server of the update. For example, a client server may be notified that a push update has been rejected if the service provider server is unable to resolve a conflict in the update based on pre-established conflict resolution rules. Further aspects of exemplary methods are described with reference to FIG. 8.

Figure 8:
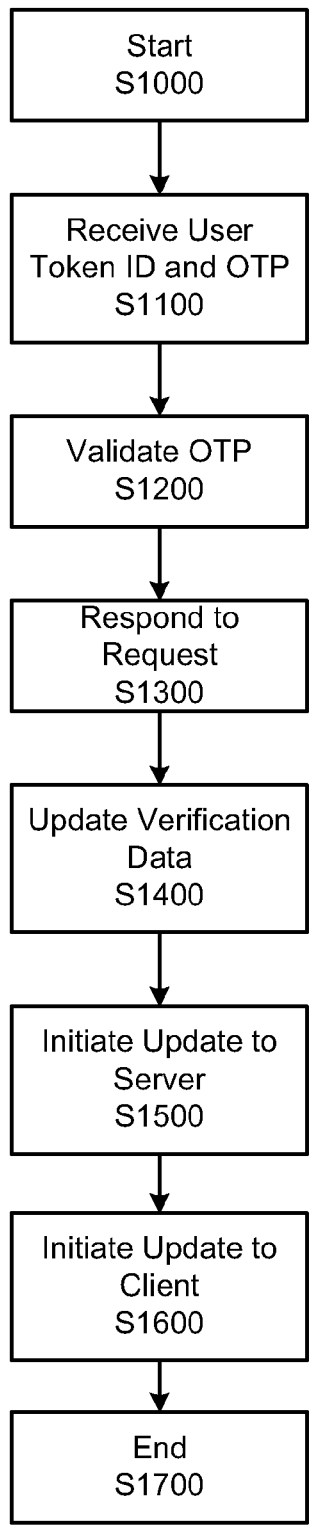
FIG. 8 depicts an exemplary method in accordance with an embodiment of the present invention.

As depicted in FIG. 8, an exemplary embodiment may begin in S1000. In S1000, a client site may populate a portion of a distributed database. This may be accomplished in a number of ways including, for example, downloading an initial set of bulk token records after a server installation. In embodiments, a token service provider's client with an issuing site may pull all token records that the client issuer owns when it is started. Alternatively, a record may be created as part of a client issuer receiving a dynamically provisioned token from a service provider in near real time. For example, when a new token is dynamically provisioned to a user's device, the token record may be first created at the overall service provider's database. Preferably, the record should be available in the client issuer's site in a short period of time so that the end user can use the token at the client issuer's site. Therefore, in embodiments, a client may monitor token changes from the service provider by pull updates, and new tokens may be downloaded in runtime.

The method may continue in S1100, in which a user token ID and OTP are received, for example at a client server. The receipt of this information may represent a request to verify the use of the user token based on the OTP. The method may continue with S1200.

In S1200, the OTP may be validated according to records maintained by the client server, or another server, such as a service provider of the user tokens. As described above, the present subject matter supports systems that, for example, allow for an issuer/client of the overall service provider to validate tokens that they are responsible for, in addition to the service provider being able to validate the tokens that have been issued. Validation can take many forms depending on the specific OTP technique employed by the service provider. S1200 will typically result in a positive or negative result, that indicates that the OTP has been validated or is invalid. In alternative embodiments, a client server may determine that they are unable to validate the OTP, and pass the request on to another validator, such as a service provider, or other client. After the validity if the OTP is determined the method may continue with S1300.

In S1300, a response to the request may be transmitted indicating that the OTP has been approved or disapproved. Various means for providing this information are known to those of skill in the art and are not described in detail herein. For example, various responses for requests to validate an OTP may allow for multiple attempts, a finite number of attempts, and other variations based on the particular OTP mechanism used. After a response to the request is sent in S1300, the method may continue with S1400.

In S1400, verification data may be updated in the client database based on the validation response. For example, in embodiments where an OTP is adjusted for a revalidation, the corresponding data in the client database will be updated upon receipt of the OTP validation. Once the verification data is updated in S1400, the method may continue with S1500.

In S1500, an update to the server database, such as a service provider's server, may be initiated based on information stored in the client database by pushing updated verification information from the client database to the server database via an SSL tunnel. In embodiments, this may be done on a regular basis, such as according to a predetermined period of time, based on a number of predetermined numbers of updates to the client database and the like. As detailed above, initiating an update to the server database by pushing updated verification information from the client database to the server database the SSL tunnel provides benefits over the known methods in the efficiency of managing information at the client level, and economizing the resources at the client level.

Prior to, contemporaneously with, or after, S1500, the method may also include S1600. In S1600, an update to the client database may be initiated based on information stored in the server database by pulling updated verification data from the server database to the client database via an SSL tunnel. As with the initiation by pushing updated information from the client database to the server database, the pulling of updated verification data can promote efficiency of managing resources at the client level by eliminating the need for the client to monitor for updates from the server database. The initiation of the update by pulling the updated verification information may be accomplished according to a predetermined schedule, a number of updates received, and the like.

Upon receipt of updated information in either of S1500 and/or S1600, the verification data regarding the token identifier may be updated in the client database based on updated information pulled from the server database. Further detail regarding embodiments with respect to the initiation of updates to the client are further described with reference to FIG. 9.

Figure 9:
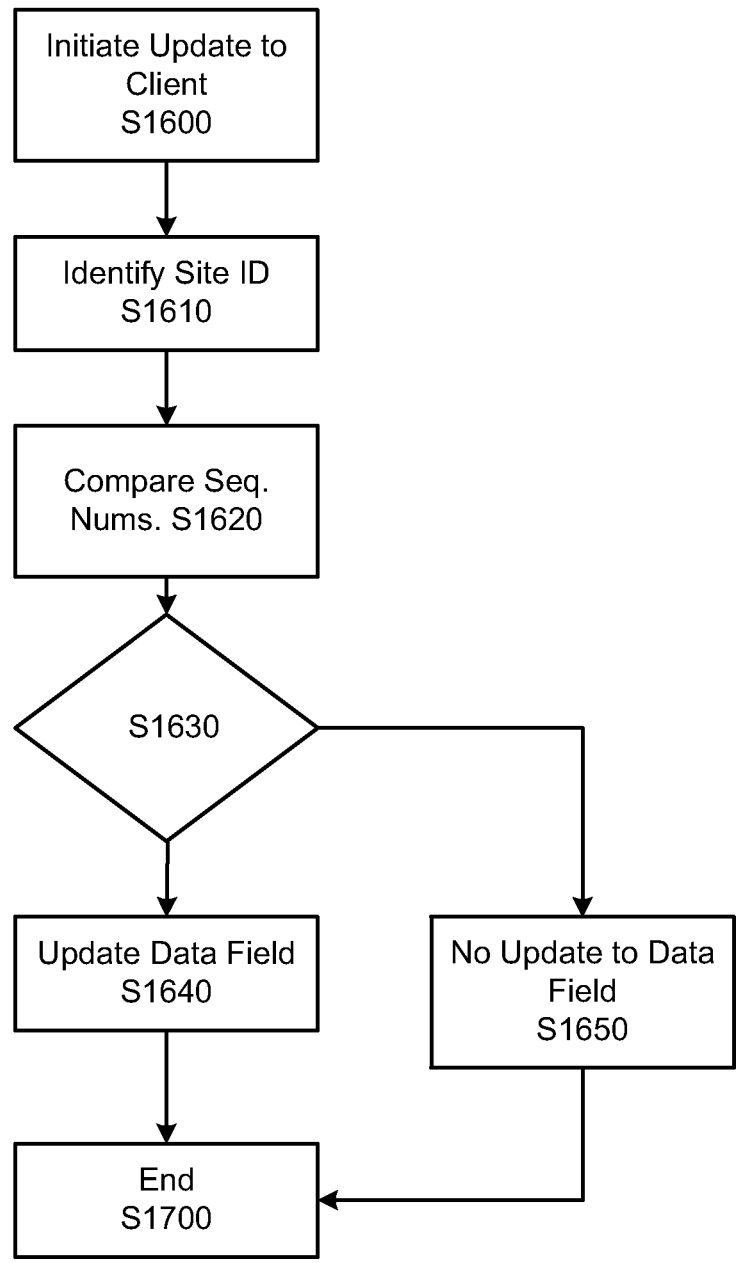
FIG. 9 depicts an exemplary method in accordance with an embodiment of the present invention.

As depicted in FIG. 9, the embodiments may include initiating an update to the client, as described with respect to S1600. The method may continue with S1610.

In S1610, a site ID may be identified. The site ID. may include a unique identifier to identify the respective database in which it is included. In this regard, the client database and the server database may each include a two dimensional field including verification data and an associated key identifier, along with the site ID. A sequence number may be assigned to each row of data, the sequence number increasing every time the row open information is updated. A replication tracking table may also be included that has a record of the last known update to at least one of the server database and another client database. In embodiments, the record of the last known update reflects a sequence number from a remote database. The record may include a site ID and a sequence number from a remote database. After a site ID is identified in S1610, the method may continue with S1620.

In S1620, a sequence number may be compared in the server database and at least one of the client databases. A data field may be determined to have been changed when it has a larger sequence number than that of a data in another database with the same site ID. For example, in S1630, if it is determined that there is not a larger sequence number in a data field shared by the databases, no update to data fields is necessary and the method may continue with S1650.

On the contrary, if it is determined in S1630 that a data field that is contained in the replication tracking table in one server is different than the sequence number of the data record in the other database, it may determined that a data field has been changed. Accordingly, a data field and sequence number may be updated in S1640. Various methods for determining which of the data fields and sequence numbers should be updated based on the other data field and sequence number, are discussed further herein.

After it is determined whether any data field and/or sequence number needs to be updated, and any necessary updates are complete, the method may continue with S1700, where the method ends.

Figure 10:
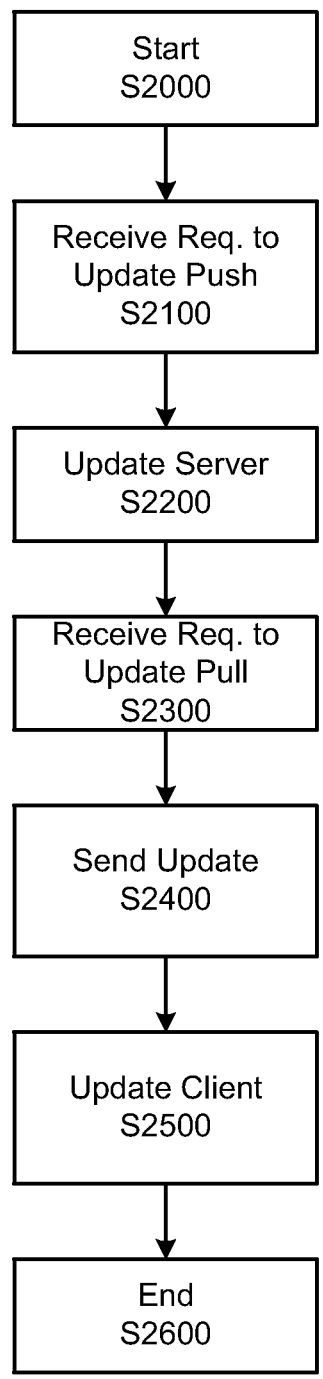
FIG. 10 depicts an exemplary method in accordance with an embodiment of the present invention.

FIG. 10 depicts an embodiment with respect to methods that may be performed at a service provider server. For example, embodiments may include a method beginning with S2000. The method may continue with S2100.

In S2100, a request to update a client database may be received at the service provider server. As described herein, the request to update service provider data may be in the form of a "push request" from a client service provider server. The method may continue with S2200.

In S2200, the service provider server may be updated based on any information that is pushed from the client to the service provider server. This may include updating verification data, such as data fields associated with OTP information, and the like.

Before, contemporaneous with, or after updating the service provider server based on the updated information pushed to the server, a service provider server may receive a request to update information via a "pull request" from a client service provider server in S2300. As discussed herein, the service provider server may evaluate the pull request to determine if any updated information needs to be sent to the client service provider server. The method may continue with S2400.

In S2400, the service provider's server may send any necessary update to a client service provider server based on the evaluation of the request to pull updated information. The method continues with S2500.

In S2500, the update information may be evaluated by the client service provider server and any necessary updates performed. For example, more recent data and sequence numbers for data may be received and implemented in the client service provider database. A pull operation from the client may also result in the identification of new records to be added to the client service provider database. This may include the service provider server including a shared secret for the new record in the update reply. The presence of such information may operate as a flag to the client service provider server to create a new record, such as a new OTP token record. After any necessary updates are performed in the client service provider database, the method may continue with S2600 where the method ends.

As discussed above, token validation, and the like, may introduce changes to token data that should be replicated to other sites in near real time. For example, a shared token may be validated in either an issuer's site or the service provider's site. In a preferred embodiment, once a token state is changed, the token runtime data should be replicated as soon as possible to all other sites to help prevent OTP replay attack.

Figure 11:
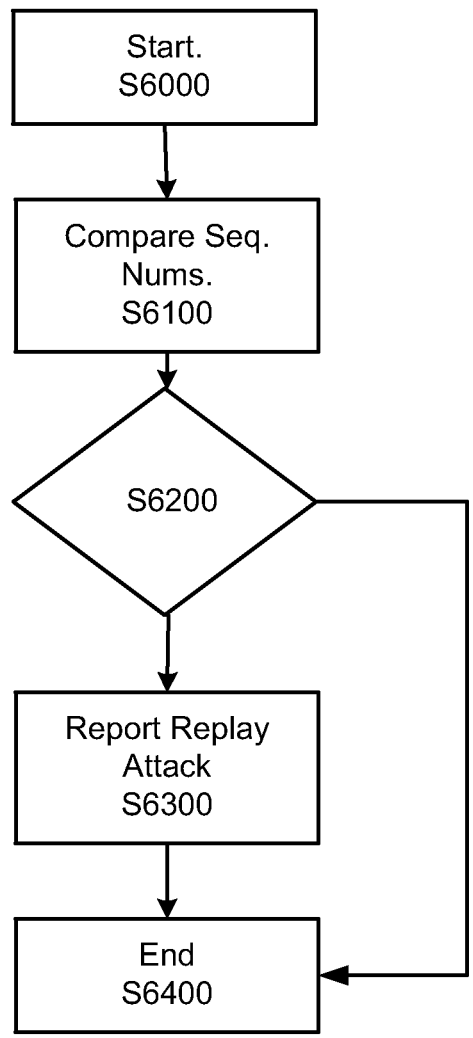
FIG. 11 depicts an exemplary method in accordance with an embodiment of the present invention.

When OTP replay attack does occur, the token runtime data may appear to conflict, for example, the OTP counter for an event based token is changed because of an independent update in each site and the new counter values in the two sites are the same. In case of a time-based token, the OTP counter is the number of time steps of the next OTP. This situation may occur when the same OTP of a token is used by the issuer itself against a local validation server, while another Relying Party uses it against a service provider's server. For example, as depicted in FIG. 11, a method may begin in S6000 before, concurrently with, or after an update operation. In S6100 the OTP counter numbers in the data from the remote site and the data in the local database may be compared. The method may continue with S6200.

In S6200, if it is determined that the OTP counters match, the method may continue with S6300. If the OTP counters do not match, then the method may continue with S6400, where the method ends.

Returning to S6300, based on the matching OTP counters a replay attack log may be stored including the relevant information. An administrator of the replication system may be notified of the discrepancy to determine an appropriate action. In embodiments, S6300 may also include automatically notifying a client and/or a relying party of a potential replay attack.

In embodiments, the conflict resolution rules may reject replication attempts that contain such discrepancies. A separate automated security event log may be used to track such events, and may be used in conjunction with an automated security event monitor to send alerts to the hosting party that a potential replay attack has occurred. Such notifications may be particularly helpful in allowing an entity, such as a client or relying party, to take timely action in fraud prevention activities and the like.

Each Relying Party has its own token status for a given token. Thus token status between two a Relying Party and the hosting issuer doesn't matter. The token status associated with the same issuer may conflict if two of its applications points respectively to VIP and local servers.

Embodiments of the present invention can include systems for implementing the described methods, as well as computer-readable storage medium coded with instructions for causing a computer to execute the described methods. For example, as shown in FIG. 1, servers 140, 150 may include a processor, a memory and an electronic communication device, e.g. a modem and the like.

Servers 140, 150 may include any number of processors (not shown) that are coupled to storage devices including a first storage (not shown, typically a random access memory, or "RAM"), second storage (not shown, typically a read only memory, or "ROM"). Both of these storage devices may include any suitable type of the computer-readable media described and/or mentioned above. A mass storage device (not shown) may also be used to store programs, data and the like and is typically a secondary storage medium, such as a hard disk that is slower than primary storage. It will be appreciated that the information retained within the mass storage device, may, in appropriate cases, be incorporated in standard manner as part of primary storage as virtual memory. A specific mass storage device such as a CD-ROM may also pass data uni-directionally to the processor.

Servers 140, 150 may also include, directly or indirectly, an interface that includes one or more input/output devices such as such as video monitors, track balls, mice, keyboards, microphones, touch-sensitive displays, transducer card readers, magnetic or paper tape readers, tablets, styluses, voice or handwriting recognizers, or other known input devices, including other computers. Such systems may be coupled to a computer or other electronic communication network using a network connection including various wired, optical, electronic and other known networks to exchange information among servers 140, 150, applications 120, 130 and user 110. The above-described devices and materials will be familiar to those of skill in the computer hardware and software arts and need not be individually or exhaustively depicted to be understood by those of skill in the art. The hardware elements described above may be configured though the use of programmed instructions stored on a computer readable medium to act as specially configured machine for performing the operations described above.

In addition, embodiments of the present invention further include computer-readable storage media that include program instructions for performing various computer-implemented operations. The media may also include, alone or in combination with the program instructions, data files, data structures, tables, and the like. The media and program instructions may be those specially designed and constructed for the purposes of the present subject matter, or they may be of the kind available to those having skill in the computer software arts. Examples of computer-readable storage media include magnetic media such as hard disks, floppy disks, and magnetic tape; optical media such as CD-ROM disks; magneto-optical media such as floptical disks; and hardware devices that are specially configured to store and perform program instructions, such as read-only memory devices (ROM) and random access memory (RAM). Examples of program instructions include both machine code, such as produced by a compiler, and files containing higher level code that may be executed by the computer using an interpreter.

The invention has been described with reference to exemplary embodiments. Modifications and alterations of the described embodiments may be evident to those of ordinary skill in the art upon a reading and understanding of this specification. The present invention is intended to include all such modifications and alterations insofar as they come within the scope of the appended claims, or the equivalents thereof.

What is claimed is:

1. A method, comprising:
   receiving a user token identifier and a one-time password from a client device at a first server;
   validating the one-time password at the first server based on first verification information stored in a first database, the first verification information being associated with the user token identifier, wherein the first database is within a first network;
   updating the first verification information in the first database to indicate that the one-time password has been used;
   initiating an update to a second database by pushing the first verification information and a site ID of the first database from the first database to the second database via a first SSL tunnel, wherein the second database is within a second network that is outside an enterprise boundary of the first network;
   initiating an update to the first database by pulling second verification information from the second database to the first database via a second SSL tunnel; and
   updating the first verification information in the first database based on the second verification information pulled from the second database, wherein at least one of the second database or the first database resolves which of the first verification information or second verification information to apply based on at least one of: unique data within the first verification information or the second verification information, timestamp data within the first verification information or the second verification information, or an authority assigned to the at least one of the second database or the first database with the first verification information or the second verification information.

2. The method of claim 1, wherein the second database exchanges verification information regarding one-time passwords to multiple databases, the method further comprising:
   providing a validation response from the first server based on the validating of the one-time password; and
   wherein updating first verification information in the first database based on the second verification information pulled from the second database comprises updating the user token identifier in the first database.

3. The method of claim 1, wherein:
   the first database and the second database each comprise:
      a two-dimensional data field including verification data and an associated key identifier;
      a site ID comprising a unique identifier to identify the respective database;
      a sequence number assigned to each row of data in a data table, the sequence number increasing every time the row is updated; and
      a replication tracking table comprising a record of a last known update to at least one of the second database or a third database, the record including the site ID and a sequence number; and
   data fields that require updating during the pulling are determined based on the site ID and a comparison of the sequence number in the second database and at least one of the first or third databases, a data field is determined to have been changed when it has a larger sequence number than that of data in another database with the same site ID.

4. The method of claim 1, wherein:
   the second database and first database are independently updated during an inter-update period between the second database and first database.

5. The method of claim 4, wherein at least one of the second database or first database resolves which of the first verification information or the second verification information to apply based on the unique data within the first verification information or second verification information.

6. The method of claim 4, wherein at least one of the second database or first database resolves which of the first verification information or the second verification information to apply based on the timestamp data within the first verification information or second verification information.

7. The method of claim 4, wherein at least one of the second database or first database resolves which first verification information or second verification information to apply based on the authority assigned to the database with the first verification information or second verification information.

8. The method of claim 4, wherein:
   the first server comprises a plurality of servers, each server maintaining a respective database; and
   different verification information conflict resolution rules are set by different servers.

9. The method of claim 4, wherein validating for a single user token identifier by various first servers proceeds asynchronously with respect to the updating.

10. A method comprising:
    receiving a request to update a server database from a first client database, the request comprising verification information of a user and a site ID of the first client database, wherein the verification information of the user relates to one-time passwords that are verified using at least one of the first client database, a second client database, or the server database, wherein the request is pushed from the first client database to the server database, wherein the first client database is within a first network;
    updating verification information stored in the server database based on the verification information from the first client database, wherein the server database is within a second network that is outside an enterprise boundary of the first network;
    receiving a request to update at least one of the first client database or the second client database by pulling the verification information from the server database to the at least one of the first client database or the second client database via an SSL tunnel; and
    sending the verification information to the at least one of the first client database or the second client database requesting the verification information from the server database,
    wherein at least one of the second database or the first database resolves which of a first verification information or a second verification information of the verification information to apply based on at least one of: unique data within the first verification information or the second verification information, timestamp data within the first verification information or the second verification information, or an authority assigned to the at least one of the second database or the first database with the first verification information or the second verification information.

11. The method of claim 10, wherein:
    the first client database, the second client database, and the server database each comprise:
       a two-dimensional data field including the verification information and an associated key identifier;
       a site ID comprising a unique identifier to identify the respective database; and
       a sequence number assigned to each row of data in a data table, the sequence number increasing every time the row is updated; and
       a replication tracking table comprising a record of a last known update to at least one of the server database or the second client database, the record including the site ID and a sequence number; and
    data fields that require updating are determined based on the site ID and a comparison of the sequence number in the server database and at least one of the first client database or the second client database, a data field is determined to have been changed when it has a larger sequence number than that of data in another database with the same site ID.

12. The method of claim 10, wherein:
    verification information in the server database and the first client database are independently updated during an inter-update period between the server database and the first client database;
    at least one of the server database or the first client database resolves which verification information to apply based on at least one of unique data within verification information, timestamp information within the verification information; and an authority assigned to the database with the verification information.

13. The method of claim 12, wherein at least one of the server database or the first client database resolves which verification information to apply based on the unique data within the verification information.

14. The method of claim 13, wherein at least one of the server database and first client database resolve which verification information to apply based on the timestamp information within the verification information.

15. The method of claim 13, wherein at least one of the server database and first client database resolve which verification information to apply based on the authority assigned to the database with the verification information.

16. A method comprising:
receiving an identifier and a one-time password at a client;
validating the one-time password at the client based on verification information stored in a client database, the verification information being associated with the identifier;
performing an update operation to first verification information in the client database to indicate that the one-time password has been used, wherein the client database is within a first network;
initiating an update to a server database from the client database by pushing first verification information and a site ID of the client database from the client database to the server database, the site ID comprising a geographic identifier to identify the client database, wherein the server database is within a second network that is outside an enterprise boundary of the first network;
initiating an update to second verification information in the client database from the server database by pulling first verification information from the server database to the client database; and
updating the second verification information in the client database based on first verification information pulled from the server database,
wherein at least one of the server database or the client database resolves which of the first verification information or second verification information to apply based on at least one of: unique data within the first verification information or the second verification information, timestamp data within the first verification information or the second verification information, or an authority assigned to the at least one of the server database or the client database with the first verification information or the second verification information.

17. The method of claim 16, wherein the server database exchanges verification information regarding one-time passwords to multiple client databases, the method further comprising:
providing a validation response from the client based on the validating of the one-time password, wherein the first verification information is updated in the client database based on the validation response.

18. The method of claim 16, wherein the updating are conducted over an SSL tunnel between the server database and the client database.

19. The method of claim 16, wherein the updating are initiated only by requests from a client and conducted over an SSL tunnel between the server and the client database formed in response to the requests.

20. The method of claim 16, wherein:
the client database and the server database each comprise:
a two-dimensional data field including verification data and an associated key identifier;
a site ID comprising a unique identifier to identify the respective database;
a sequence number assigned to each row of data in a data table, the sequence number increasing every time the row is updated; and
a replication tracking table comprising a record of a last known update to at least one of the server database and a second client database, the record including the site ID and a sequence number; and
data fields that require updating are determined based on the site ID and a comparison of the sequence number in the server database and at least one of the client database or the second client database, a data field is determined to have been changed when it has a larger sequence number than that of data in another database with the same site ID.

21. The method of claim 1, further comprising:
comparing a sequence number associated with first verification information from the first database to another sequence number associated with stored information in at least one of a third database or the second database; and
if the sequence numbers match, reporting a replay attack associated with a key identifier for the first verification information.

22. The method of claim 10, further comprising:
comparing a sequence number associated with verification information from the first client database to another sequence number associated with stored information in at least one of the second client database or the server database; and
if the sequence numbers match, reporting a replay attack associated with a key identifier for the verification information.

23. The method of claim 18, further comprising:
comparing a sequence number associated with verification information from the client database to another sequence number associated with stored information in at least one of a second client database or the server database; and
if the sequence numbers match, reporting a replay attack associated with a key identifier for the verification information.

24. The method of claim 1 further comprising updating a plurality of databases, wherein the plurality of databases are distributed among a plurality of sites, wherein at least one of the plurality of databases is across an enterprise boundary from the first database.

* * * * *